Aug. 29, 1933.    A. R. LEWELLEN    1,924,248
SWITCH MECHANISM
Filed Sept. 25, 1931

Inventor
Albert R. Lewellen

By Spencer Hardman & Fehr
His Attorneys

Patented Aug. 29, 1933

1,924,248

UNITED STATES PATENT OFFICE 1,924,248

SWITCH MECHANISM

Albert R. Lewellen, Detroit, Mich., assignor to Delco-Remy Corporation, Anderson, Ind., a Corporation of Delaware Application September 25, 1931
Serial No. 565,029

6 Claims. (Cl. 200—59)

This invention relates to electrical switches and more particularly to switches adapted to be operated by a pedal of an automobile for the purpose of closing a circuit to a warning signal or other indicator at the rear end of a vehicle.

An object of the present invention is to provide a pedal operated switch which is very simple and inexpensive in construction, easily assembled and installed, and which is highly efficient and satisfactory in practical use.

Another object of the present invention is to provide for the quick closing of a rotary contact type switch that will be readily responsive, and certain of operation upon a slight movement of a pedal control mechanism. This object is accomplished by providing a switch having an operating lever, the lever cooperating with a part carried by a pedal of the control mechanism for operating a circuit closing mechanism. The lever is so constructed and arranged and so located with respect to the operating pedal, that an accelerated movement relative to movement of the pedal is imparted to the circuit closing mechanism to close an electric circuit on the initial movement of the pedal; and, on continued movement of the pedal, the movement of the lever will be retarded relative to movement of the pedal. The advantage of the retarded movement, is that the contact surfaces on the movable member of the circuit closing mechanism need be relatively shot angularly in order to be maintained in contact with the stationary contacts of the switch during movement of the pedal beyond that required to close the contacts of the switch.

Further objects and advantages of the present invention will be apparent from the following description, reference being had to the accompanying drawing wherein a preferred embodiment of one form of the present invention is clearly shown.

Figure 1:
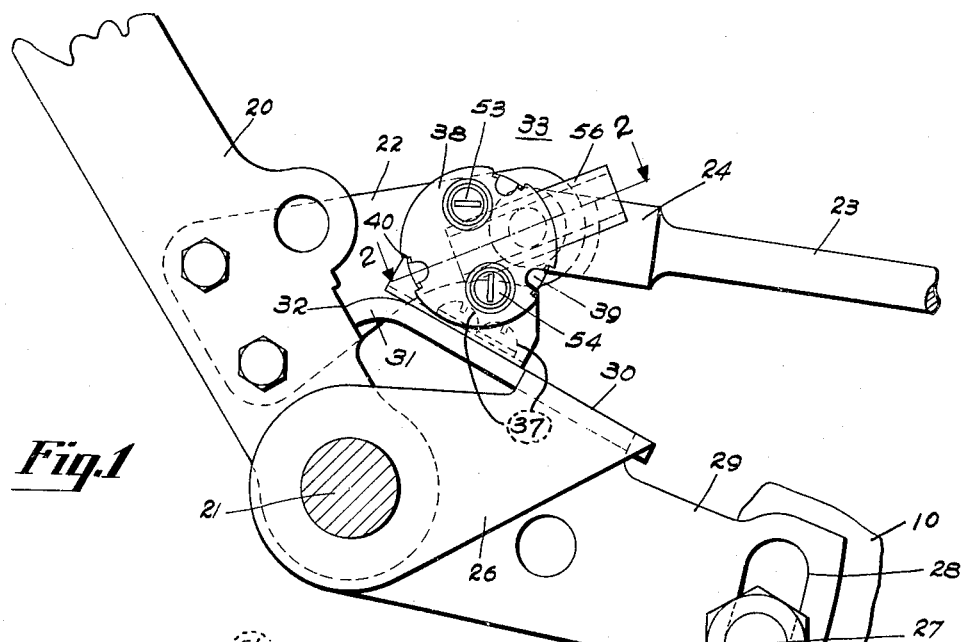
Fig. 1 is a fragmentary side view of a brake pedal mechanism, showing a switch construction according to the present invention mounted thereon.

Referring to the drawing, 20 indicates a pedal member of a brake control mechanism, journalled upon a shaft 21 to the frame 10 of an automotive vehicle. The pedal 20 has an arm 22 attached thereto to which is secured a brake rod 23 by a yoke portion 24 through the agency of a pin 25. It is to be understood that the brake rod 23 may be attached to the brake pedal in any conventional form of brake operating mechanism or other control means as may be desired and that the manipulation of the pedal 20 will operate to reciprocate the rod 23 as is well known to those skilled in the art. A pedal stop 26 is also carried by the shaft 21 and is capable of adjustment by a stud or rod 27 or other suitable means through an elongated aperture 28 provided in an arm 29 of the pedal stop member. The pedal stop 26 has a table or flat portion 30, one end of which is deformed to provide an abutment or stop 31 adapted to engage a face 32 of the pedal 20. Thus it is seen that adjustment of the member 26 about the shaft 21 will vary the angular position of the stop 31 with respect to the shaft 21, On the flat portion 30 of the pedal stop 26 there is secured a switch 33, the switch comprising cup-shaped case or housing 34 having its end wall 35 attached to a bracket 36, by spot welding or the like, by which the switch may be mounted upon the flat portion 30 by screws 37. The open end of the casing is closed by a terminal carrying head 38 secured in place by tongues or projections 39 depending from the peripheral edge of the case 34 to engage in notches or grooves 40 of the head 38 and bent over in a manner illustrated in Fig. 2.

Figure 2:
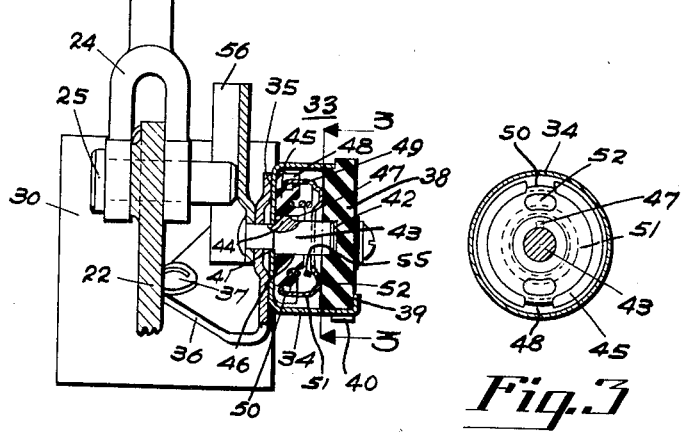
Fig. 2 is a sectional view taken on the line 2—2 of Fig. 1.
Figure 3:
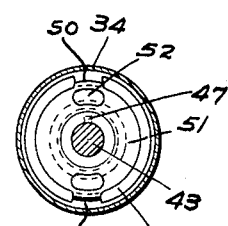
Fig. 3 is a sectional view taken on the line 3—3 of Fig. 2.

The end wall 35 and the head 38 are provided with an aperture 41 and a recess 42 respectively, in direct alignment with each other and supports a shaft 43. The shaft is provided with a spine or key 44 to connect drivingly the shaft 43 with a non-conducting contact carrier or support 45. As shown in Fig. 2, the contact carrier is provided with an aperture 46 shaped to receive the shaft 43 and having a notch 47 for receiving the key 44. The contact carrier is provided with notches 48 on its peripheral edge, adapted to receive outwardly extending arms or fingers 50 of a bridging member or movable contact 51, the fingers being turned inwardly to engage behind the shoulders 49 of the carrier, there being sufficient play between the shoulders 49 and the end wall 35 to permit axial movement of the bridging member with respect to the contact carrier, but preventing rotary movement therewith. The bridging member 51 is provided with bosses 52 adapted to slide over the terminal head 38 and make engagement with embedded stationary contacts 53 and 54 arranged in a common arc and flush with the inner surface of the head.

A spring 55 is disposed between the contact carrier 45 and the movable contact 51 respectively, which urges the same along the axis of the shaft 43 against the end wall 35 and the terminal head 38 respectively, yet is sufficiently yieldable to allow the bosses 52 of the member 51 to pass over any quality of surface with which they may come into engagement.

Figure 5:
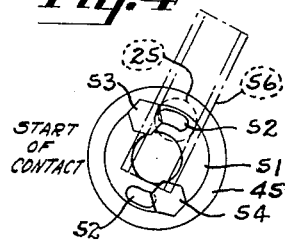
Fig. 5 is a view showing the relation of the contacts when the brake pedal has moved a slight distance.
Figure 6:
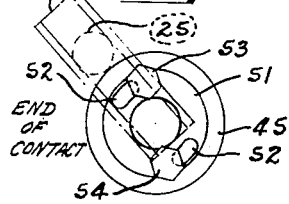
Fig. 6 is a view showing the relation of the contacts when the brake pedal has moved its entire braking distance.

It is desirable to provide an operable connection between the pedal 20 and the switch lever 56 such that when the pedal 20 moves a short distance, the switch lever 56 will respond quickly to actuate the circuit closing means to close a circuit, and then when the circuit is closed, the actuation of the lever will be retarded to provide an extended circuit closing condition between the bosses 52 and the stationary contacts 53 and 54. This is accomplished by providing means for moving a contact actuator assembly within the switch comprising the carrier 45, the movable contact 51, the shaft 43 and the spring 55, and securing one end of the shaft 43 to a U-shaped member or a channeled lever 56 adapted to receive one end of the pin 25. It will be noted that the pedal 20 is pivoted about the shaft 21 and the lever 56 is fast on the shaft 43 of the switch structure 33. When the pedal 20 is depressed away from the stop 31 in a counter clockwise direction as viewed in Fig. 1, the pedal will cause the pin 25, extending into the channel of the lever 56 to move inwardly a slight distance to actuate rapidly the lever 56 in its initial movement to operate the movable contact 51 causing the bosses 52 to close a circuit as shown in Fig. 5, but as the pedal 20 is depressed further, the movement of the lever 56 is retarded, due to the fact that the pin 25 will slide outwardly within the channel of the lever 56. The movement of the pin 25 with respect to lever 56 is clearly shown by dot-and-dash line in Figs. 4, 5 and 6. When the lever 56 is moved into a counter-clockwise direction, the shaft 43 will move the bosses 52 of the contact 51 into engagement with stationary contacts 53 and 54 as shown diagrammatically in Fig. 5. The contact bosses 52 are so arranged with respect to the stationary contacts 53 and 54, that a slight depression of the pedal 20 will cause an electric circuit to be made by the switch, and this circuit will be maintained closed on further depression of the pedal 20 as shown in Fig. 6.

Figure 4:
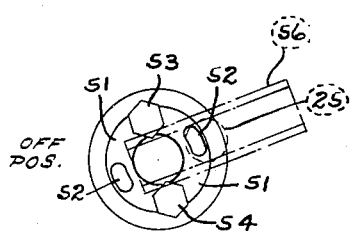
Fig. 4 is a diagrammatic showing of the contacts in a circuit open position.

When the pedal 20 is released it will be returned to normal position in any suitable manner, as by springs not shown, thereby permitting the lever 56 to be returned to the position shown in Figs. 1 and 4, in which the surface 32 of the lever 20 engages the stop 31 to limit the return movement of the lever 20.

It is therefore apparent that from the foregoing description of the construction and mode of operation of the present invention that there has been provided a switch of durable and compact construction and suitable for operation by a pedal of an automobile for controlling a circuit in which it requires but little movement of the pedal to provide for a quick closing of the circuit. The pedal being constructed and arranged and so located with respect to the pedal, that the accelerated movement of the lever relative to the pedal is imparted to the circuit closing mechanism to close an electric current on a short angular movement of the pedal. By continuing the movement of the pedal, the movement of the lever will be retarded relative to the movement of the pedal for which the contact surfaces of the movable member of the circuit closing mechanism need be relatively short angularly in order to be maintained in contact with the stationary contacts of the switch during the movement of the pedal beyond that required to close the contacts of the switch.

While the form of embodiment of the present invention as herein disclosed, constitutes a preferred form, it is to be understood that other forms might be adopted, all coming within the scope of the claims which follow.

What is claimed is as follows:

1. A switch actuator mechanism comprising in combination; a switch having a lever to actuate a circuit closing mechanism; a pedal; a rod; and means connecting said rod with said pedal, said means cooperating with said lever to actuate said circuit closing mechanism on movement of said pedal.

2. A switch actuator mechanism comprising in combination; a switch having a lever provided with a channel to actuate a circuit closing mechanism; a pedal; a rod; and a pin connecting said rod to said pedal, said pin having an end extending into said channel to actuate said circuit closing mechanism on movement of said pedal.

3. A switch actuator mechanism comprising in combination; a switch having a rotatable switching member; an arm to rotate said member; a pedal; a rod; and a pin connecting said rod to said pedal, said pin having an end cooperating with said arm to turn said switching member on movement of said pedal.

4. A switch actuator mechanism comprising in combination; a switch having a lever provided with substantially parallel extensions to actuate a circuit closing mechanism; a pedal; a rod; and a pin connecting said rod to said pedal, said pin having an end extending between said extensions to actuate said circuit closing mechanism on movement of said pedal.

5. A switch actuator mechanism comprising in combination; a switch having a rotatable switching member; an arm having a recess to rotate said member; a pedal; a rod; and means connecting said rod to said pedal and extending into said recess to actuate said arm on movement of said pedal.

6. A switch actuator mechanism comprising in combination; a switch having a lever to actuate a circuit closing mechanism; a pedal; a rod; and means connecting said rod with said pedal and disposed in the path of the lever to actuate same on movement of said pedal.

ALBERT R. LEWELLEN.